F. J. STRAUB.
MACHINE FOR MAKING BUILDING BLOCKS.
APPLICATION FILED NOV. 15, 1920.

1,399,325.

Patented Dec. 6, 1921.
9 SHEETS—SHEET 1.

F. J. STRAUB.
MACHINE FOR MAKING BUILDING BLOCKS.
APPLICATION FILED NOV. 15, 1920.

1,399,325.

Patented Dec. 6, 1921.
9 SHEETS—SHEET 3.

Witnesses:

Inventor:
Francis J. Straub
by C. M. Clarke
Atty.

F. J. STRAUB.
MACHINE FOR MAKING BUILDING BLOCKS.
APPLICATION FILED NOV. 15, 1920.

1,399,325.

Patented Dec. 6, 1921.
9 SHEETS—SHEET 9.

Witnesses:

Inventor:
Francis J. Straub
by C. M. Clarke
Atty

UNITED STATES PATENT OFFICE.

FRANCIS J. STRAUB, OF NEW KENSINGTON, PENNSYLVANIA.

MACHINE FOR MAKING BUILDING-BLOCKS.

1,399,325. Specification of Letters Patent. Patented Dec. 6, 1921.

Application filed November 15, 1920. Serial No. 424,133.

*To all whom it may concern:*

Be it known that I, FRANCIS J. STRAUB, a citizen of the United States, residing at New Kensington, in the county of Allegheny and State of Pennsylvania, have invented certain new and useful Improvements in Machines for Making Building-Blocks, of which the following is a specification.

My invention relates to improvements in an apparatus for molding plastic blocks, and particularly hollow building blocks.

It is the object of the present invention to provide an apparatus wherein a movable mold is provided so that the various operations of filling, pressing, and stripping may be effected at different places, the arrangement being such that the molds may preferably be stripped at the drying kilns, in order that a minimum handling of the blocks after molding and before they have hardened is required.

It is a further object of the invention to provide molding apparatus in which the pressure is applied to the contents of the molds at each end in order that blocks of substantially uniform density may be obtained.

A further object of the invention is to provide a truck which may be rolled from place to place, and which has one or more vertically movable molds thereon, with means for properly manipulating the molds.

A further object of the invention is to provide a second movable truck capable of receiving the mold trucks, and having means thereon coöperating with the mold trucks for stripping the molded blocks from the molds.

These and other objects will be apparent from the following description.

According to my invention, I provide a mold filling mechanism and a press at different places in a suitable plant or installation. Tracks are provided on which the trucks may be rolled from one point to another, including positions beneath the filling and pressing devices. These trucks are preferably provided with vertically movable molds and cores. The trucks are first positioned beneath the filling apparatus, where the molds are evenly filled, and then they are moved beneath a press, where pressure is applied to the material in the molds from the top and from the bottom.

After being pressed, the mold trucks are run on to a stripping device, which stripping device is preferably carried on a truck. A system of tracks is provided whereby the stripping truck may be run into a kiln where the blocks are ejected from the mold. After the blocks have been removed and piled in the kiln for drying, the stripping truck may be run back after another mold truck and the empty mold truck may be returned to be re-filled.

The foregoing description sets forth briefly the nature of my invention, which may be more fully understood in connection with the accompanying drawings, in which,—

Fig. 1ª represents diagrammatically the preferred arrangement of the floor level in the plant as shown in Fig. 1;

Figure 1:
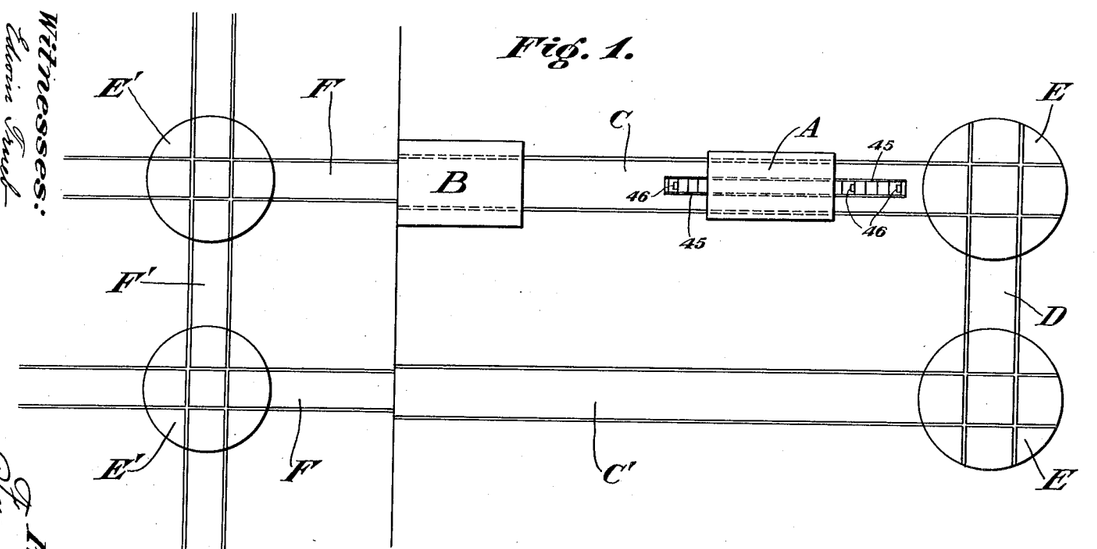
Figure 1 is a plan view showing a typical arrangement of the machinery, tracks, and kilns for producing blocks in accordance with my invention.
Figure 1A:
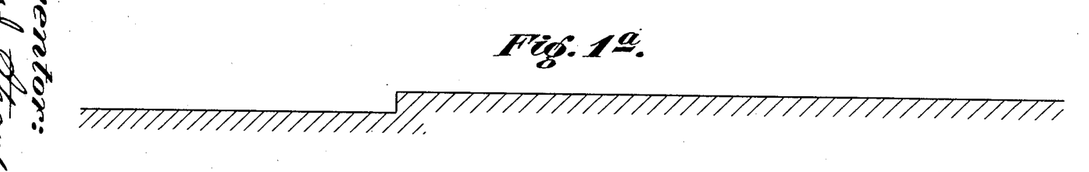

In the drawings, Fig. 1 shows a plan view of the lay-out of a plant with a preferred arrangement of tracks and apparatus. As indicated in Fig. 1ª of the drawings, a part of the floor of the plant is at a higher level than the floor of the kilns. Positioned on the raised portion of the floor is the mold charger or filling device A and a press is indicated at B. Parallel tracks are indicated at C and C', and D is a transverse track section from which trucks can be transferred from track C' to track C by means of turntables E. Track C extends beneath the mold filler A and the press B. On the lower level are tracks F in alinement with the parallel tracks C and C', and F' is a transverse track section. E' are suitable turn-tables. Tracks F and F' lead to the kilns (not shown).

Figure 6:
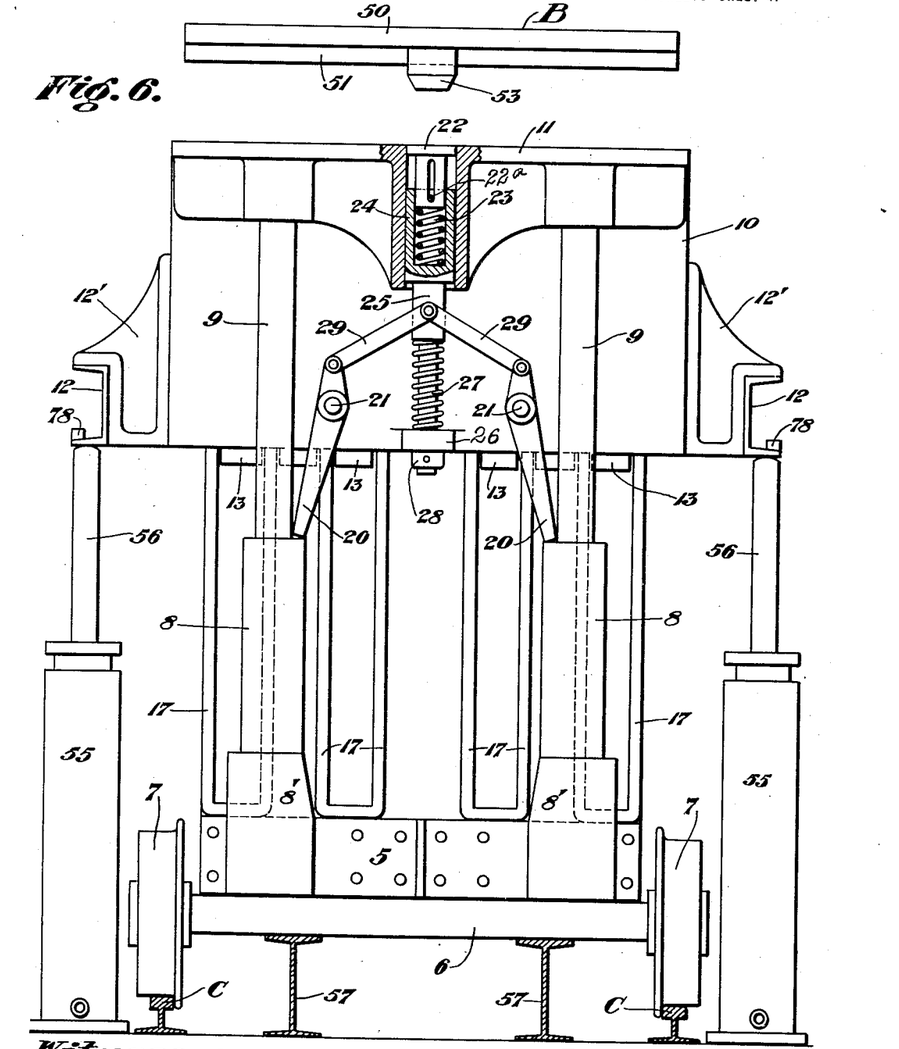
Fig. 6 is an end elevation of one of the mold trucks when in position in the press.
Figure 7:
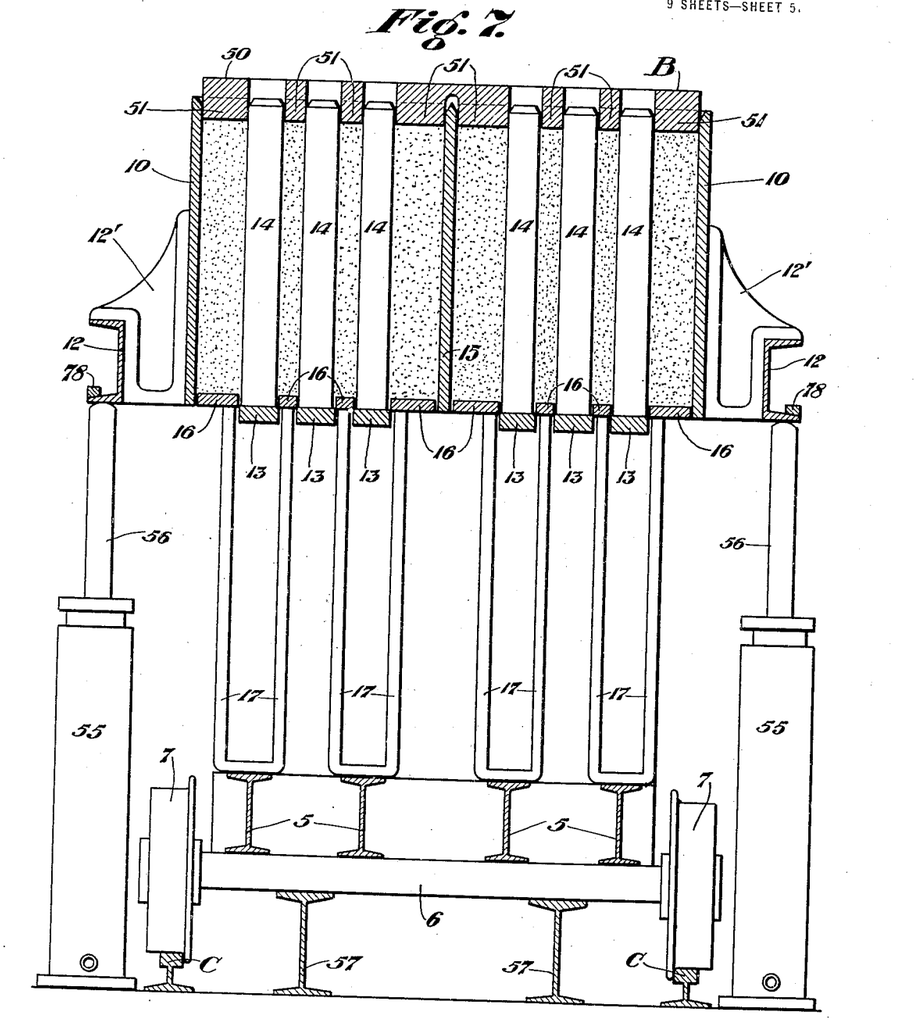
Fig. 7 is a sectional view of a mold truck with the mold filled and the press cover in pressing relation with the mold.

The mold comprises a bed frame 5 supported on axles 6 and wheels 7. At each end of the frame in sockets 8' are guide cylinders 8, (see Figs. 2 and 6), in which telescope guide rods 9. These guide rods are connected at their upper ends to a vertically movable rectangular mold frame 10 and serve to maintain it level at all times. Rigidly secured to the mold frame 10 are end members 11 and lugs 12' to which side channels 12 are fastened. Longitudinal bottom plate members 13 support the mold cores 14; suitable partitions are provided at 15. Above the longitudinal bottom plate members 13 are provided vertically adjustable bottom plate members 16 having openings therein through which the cores 14 project and which are carried on the upper ends of the supports 17. These supports preferably comprise longitudinally extending plates bent to form a U-shaped structure, as shown in Fig. 7, having their bottoms secured to the truck frame 5.

The mold frame 10, end members 11, and side channels 12, together with plates 13, cores 14, and partitions 15, are all assembled as a unit. The bottom plates 16, however, are entirely separate and have a sliding engagement with the interior of the molds. It will be seen that when the mold frame with its various attached parts moves downwardly, the bottom plates 16 will remain stationary by reason of these being carried on independent supports 17, and that the further the mold frame 10 is lowered, the nearer the plates 16 will be to the top of the mold frame until the mold frame reaches its lowermost position shown in Fig. 9, when they will project above the top thereof.

Figure 9:
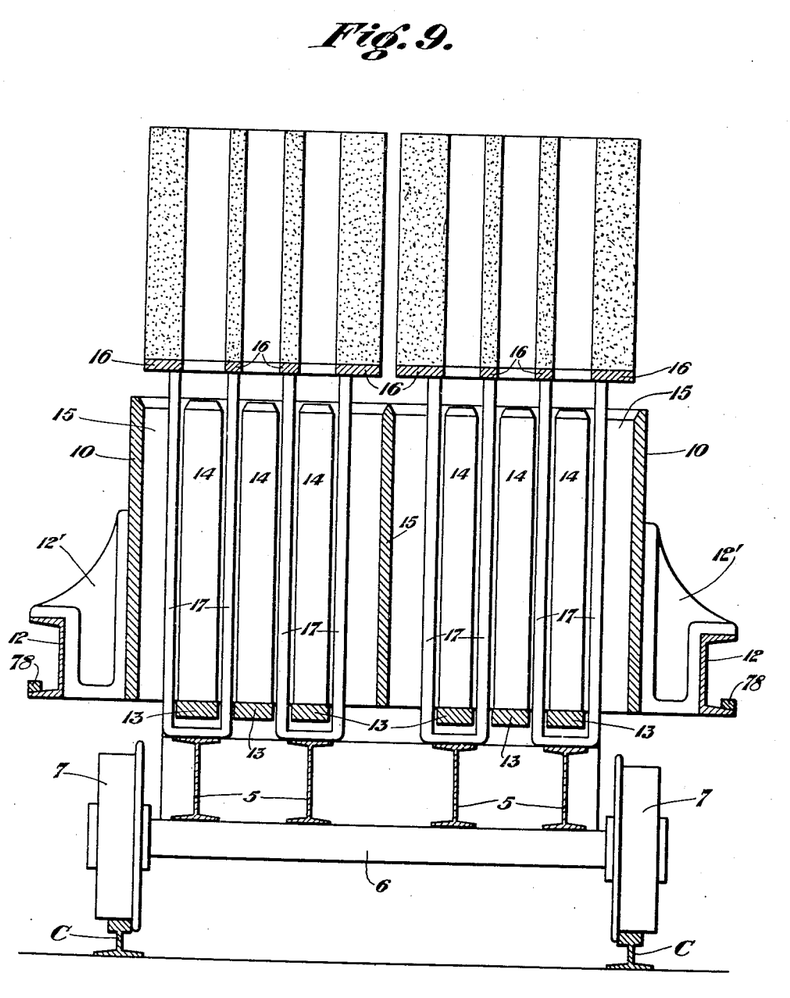
Fig. 9 is a sectional view similar to Fig. 8 but showing the mold in its lowermost position and showing the blocks ejected therefrom.

By reason of the weight of the mold frame 10, it would, when empty, naturally assume the position shown in Fig. 9, and therefore, in order to hold the mold frame in elevated position while it is being filled and before it is in the press, I provide a pair of latches 20 at each end of the mold frame, which latches are pivoted on pins 21. For operating the latches to release them, a plunger 22 is provided in each of the end members 11, which plunger is supported on a compression spring 23 in a socket in a second plunger 24. A pin and slot arrangement as shown in Fig. 6 and indicated at 22$^a$, serves to limit the movement of plunger 22.

The second plunger 24 has a downwardly extending stem 25 passing through a guide 26 on the mold frame, surrounded by a compression spring 27 which normally urges the plunger upwardly. 28 is a collar for limiting the upward movement of the plunger. Links 29 pivoted to plunger 24 have their opposite ends pivotally connected to the latch members 20. The plunger 22 is normally held flush with the top of the mold frame, and serves to prevent the material of which the blocks are formed from entering into the latch operating mechanism and filling up the opening in which plunger 24 operates. By pushing the plunger 22 sufficiently far inwardly, the plunger 24 may also be depressed, thus transmitting motion to links 29, which in turn rock the upper ends of latches 20 outwardly, moving the opposite ends thereof in the opposite direction to disengage sleeves 8.

In operation, the mold trucks, which are separate transportable units entirely detached from the other apparatus, are first run under a filling device A, with the mold frame held in its upwardly extended position by the latch mechanism previously described. This filling device comprises a supply chute 30 and a hopper 31 to which the chute delivers. The hopper is held over the track C by a structural frame work 32 at just sufficient height to permit the trucks with the molds raised to pass thereunder.

Figure 4:
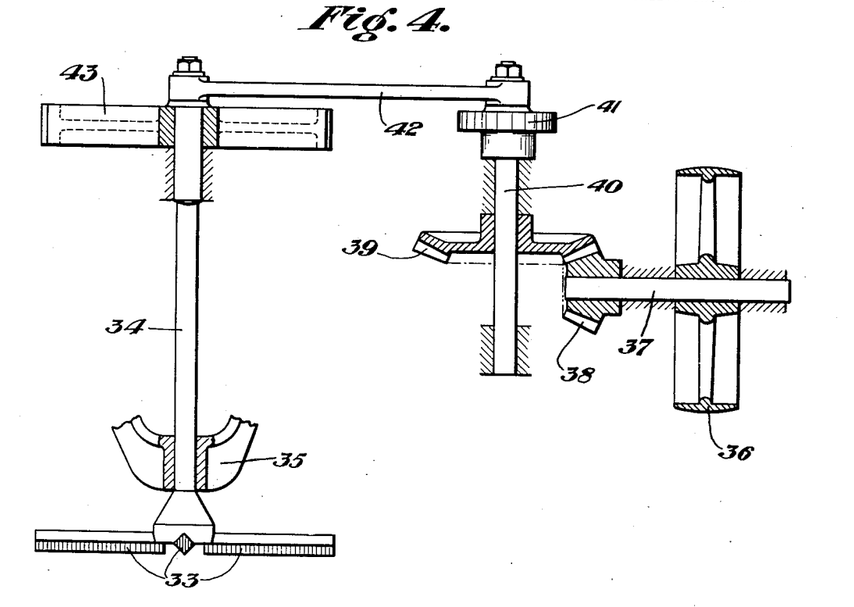
Fig. 4 shows in elevation the principal parts for rotating the agitating means in the filling device.
Figure 5:
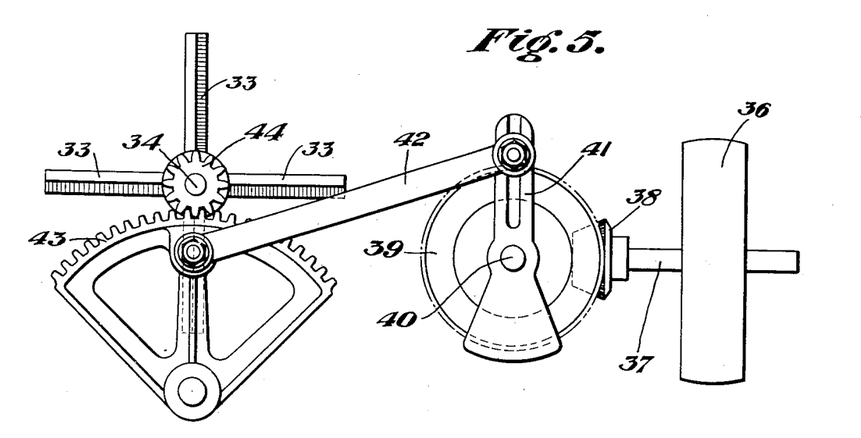
Fig. 5 is a plan view of the mechanism shown in Fig. 4.

The hopper is kept partially filled with mixed material at all times, and this material falls in the molds as they pass along under the hopper. In order that the material will not pack or clog in the hopper, and in order to sweep the material into all parts of the molds, an agitator 33 is provided. This agitator is mounted on the lower end of a vertical shaft 34 supported by a bearing 35, and is preferably driven through the mechanism shown in Figs. 4 and 5 comprising belt pulley 36, shaft 37, bevel gears 38—39, shaft 40, crank 41 having an adjustable pin thereon, connecting rod 42, and gear segment 43 which engages pinion 44 on shaft 34.

The rotation of the crank 41 oscillates the segment 42, the arc of movement depending on the adjusted position of the adjustable crank pin. This oscillation of the segment causes rotation of the shaft 34 with a reversal of the direction of rotation at each reversal of movement of the segment. It will be understood, of course, that the agitator may be continuously rotated by suitable gearing, if preferred.

Figure 2:
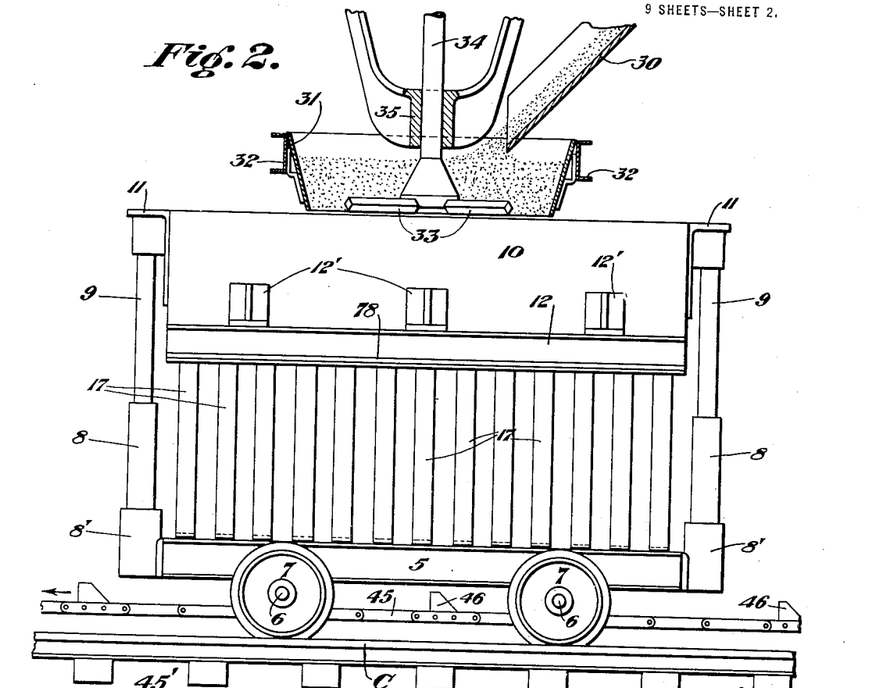
Fig. 2 is a side elevation of one of the mold trucks under the filling apparatus.
Figure 3:
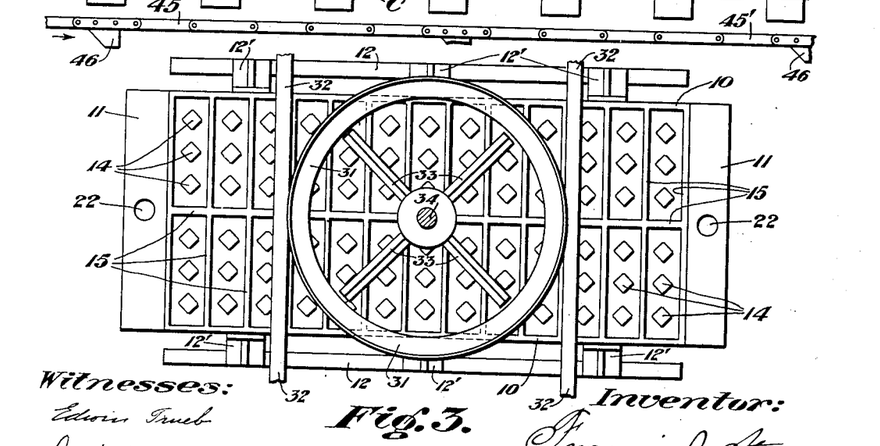
Fig. 3 is a plan view of the mold truck and filling apparatus shown in Fig. 2.

The trucks 5 are gradually moved beneath the filler by means of an endless chain 45 positioned in the track C and having dogs 46 thereon for engagement with the trucks. The return side of the chain is indicated at 45'. (Fig. 2.)

It will be seen that the action of the agitator is to sweep the material against all sides of the mold, due to its reversal of movement. Due to the gradual movement of the truck beneath the agitator, the agitator also engages the molds at various angles, and in this way forces the material into all of the corners. As the molds come under the agitator, the diameter of which is substantially equal to the width of the mold frame 10, it is tangential to a circle described by the ends of the arms of the agitator. As the mold advances, this circle becomes smaller until the center has been reached, when it starts to become larger as it moves away. The various positions of the mold with relation to the center of the agitator and of the hopper, combined with the frequent reversal of direction of rotation of the agitator, will fill all parts of the mold evenly. It is desirable that the chain and agitator be driven from a common source of power, in order that the speed of the two devices may always be substantially synchronous.

After the molds in the mold frame have been filled, the truck is moved along the track C until it is centered beneath the press B. Fig. 6 illustrates a truck positioned beneath the press before the follower or press cover has been moved into pressing relation with the mold. The press cover 50, operated by any suitable mechanism, not shown, has as many depending tamps or projections 51 thereon as there are molds in the mold frame. On each end of the cover are pilot pins 53 which locate the cover accurately over the molds as it descends and depresses the plungers 22 on each of the end members 11.

When the molds are properly positioned beneath the press cover, the cover is lowered until the pins 53 depress plunger 22 sufficiently to transmit such motion to plunger 24 to release the latches. In order to press the material sufficiently at the top of the molds it is necessary to prevent the mold frame 10 from lowering immediately upon the release of the latches, and for this purpose, hydraulic cylinders 55 having plungers 56 are provided. There may be two or more cylinders 55. The plungers engage the side frame members 12, as shown in Figs. 6 and 7. The cylinders are of small area, so that the upward pressure which they exert is only sufficient to keep the molds 10 in place against the press cover 50 while the blocks are first being pressed.

The operation of these cylinders is as follows.

Figure 8:
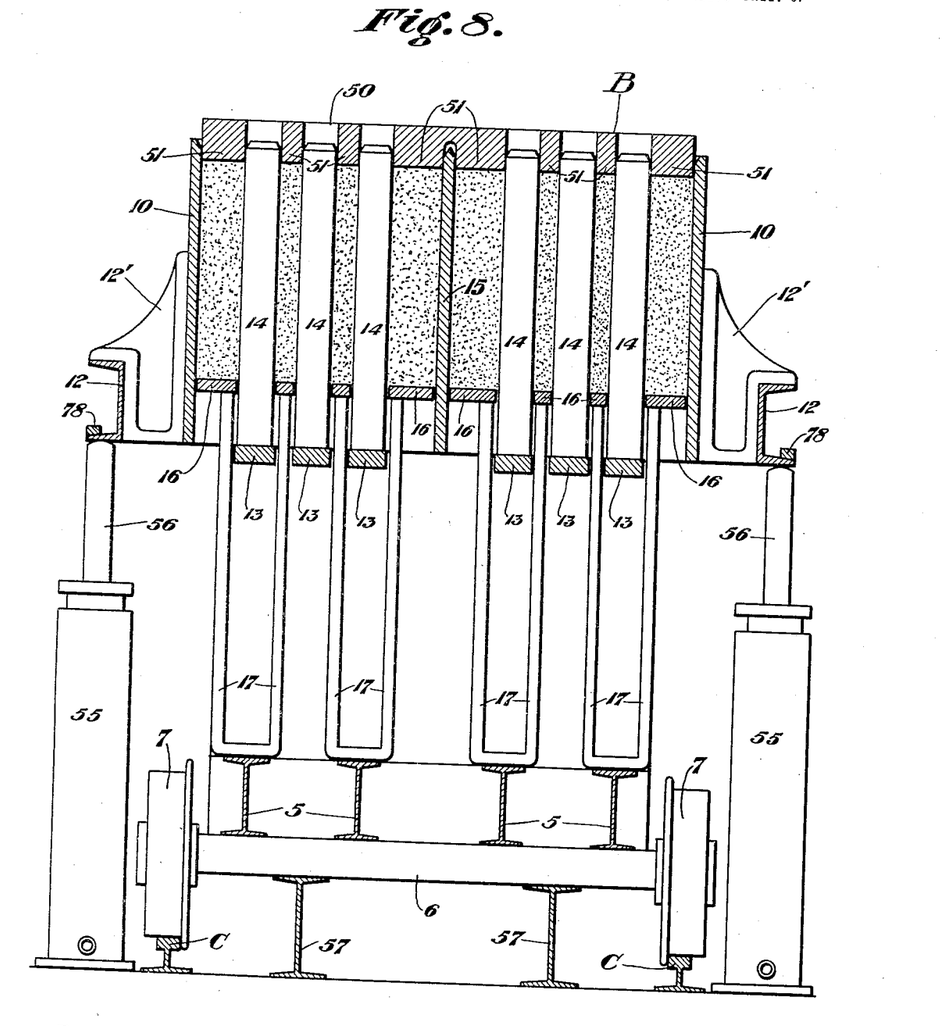
Fig. 8 is a sectional view the same as Fig. 7 except that the vertically movable mold has been partially lowered to effect pressing at the bottom of the mold.

When the mold truck is in place for pressing, pressure is turned into the cylinders 55 causing plungers 56 to move up into engagement with the frame members 12. The plungers 56 continue to rise and take the weight from the latches 20 to make it more easy to release them. As the press cover is closed, tamps 51 press the material in the upper part of the mold, as shown in Fig. 7, and at the same time pins 53 operate the latch releasing mechanism. As the press cover continues to lower, it pushes the entire mold frame downwardly against the upward pressure of plungers 56. During the downward movement of the mold frame 10, the mold bottoms 16 are prevented from moving downwardly by the rigid supports 17. Hence, pressure is simultaneously applied at the lower ends of the molds as well as at the upper end, as shown in Fig. 8. After the blocks have been pressed, the pressure from cylinders 55 is released and the molds 10 are held in partially raised position by the friction of the pressed material against the sides of the mold walls and cores. At this time, the mold cover is also lifted.

Beams 57 are a part of the press and are so placed that they support the axles 6 of the truck during the pressing operation to remove some of the strain on the wheels. Suitable brushing means, not shown, may be provided for cleaning and oiling the surfaces of the tamps.

While I have shown no operating means for the press follower 50, a hydraulic press would be preferred, because it can be made and operated in conjunction with the cylinders 55.

The blocks are removed from the molds by lowering the mold frame 10 to the position shown in Fig. 9, the bottom plates 16 remaining stationary during the lowering operation, thus ejecting the blocks as the mold is lowered until the blocks are entirely supported on the plates 16. In this position, they are ready for removal for drying and curing in the kilns.

For forcing the mold frame downwardly to the position shown in Fig. 9 and after the truck has been removed from beneath the press, the truck is run on to a stripping mechanism, preferably in the form of a truck having tracks thereon, which stripping truck may travel from place to place so that the blocks may be stripped at the kiln, thereby avoiding the necessity of transporting them any considerable distance after removal from the press and before they have hardened.

Figure 10:
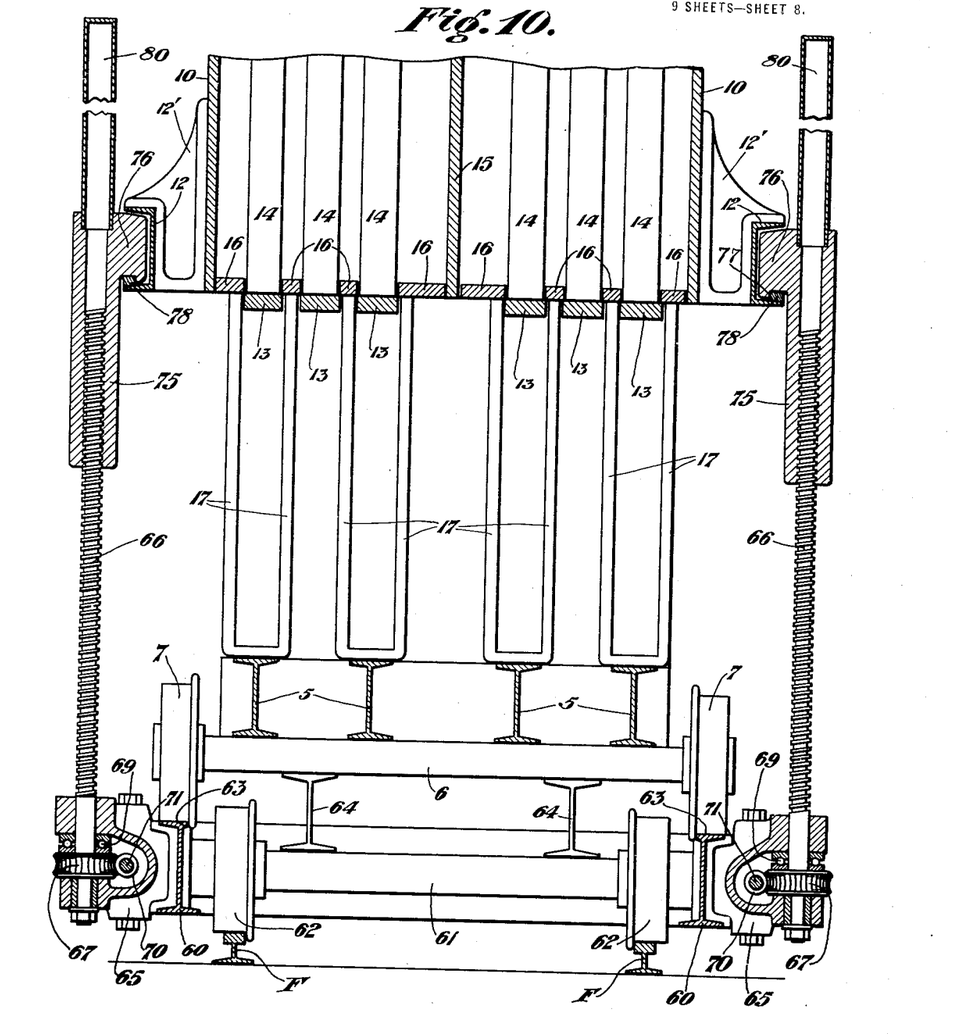
Fig. 10 is an end view partly in section showing the stripping truck with a mold truck in place ready for stripping.
Figure 11:
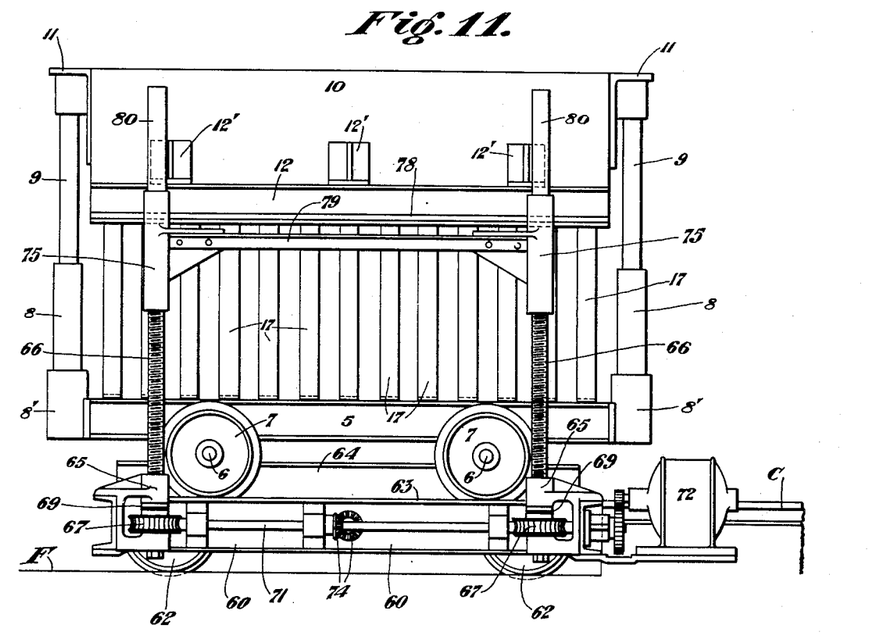
Fig. 11 is a side elevation of the apparatus shown in Fig. 10.
Figure 12:
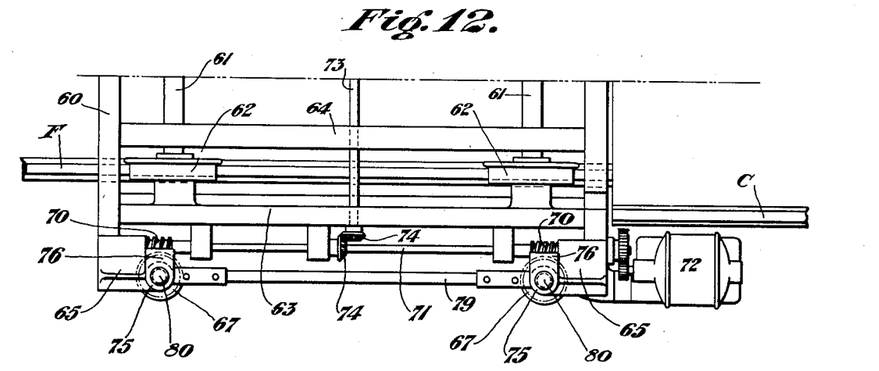
Fig. 12 is a half plan view of the stripping mechanism and truck shown in Fig. 11.

This stripping truck is shown in Figs. 10, 11 and 12 with a mold truck in position thereon. It comprises a frame 60 supported on axles 61 and wheels 62. The upper edges of frame members 63 provide tracks for wheels 7 of the mold trucks. At 64 are brace bars to support the axles 6 of the mold truck during the stripping operation. At each corner of truck frame 60 is a journal bracket 65 in which is a vertical screw 66 having a worm wheel 67 near the lower end thereof. Roller bearings 69 may be provided to reduce the friction at the upper side of worm wheel 67 during the stripping operation. These vertical screws 66 are made to rotate by worms 70 on longitudinal shafts 71 at each side of the truck frame. One of the shafts 71 is driven from a suitable motor 72 geared thereto, and the other shaft 71 at the opposite side of the machine is driven from the same source of power at the same speed by a cross shaft 73 and bevel gears 74.

On each of the screws 66 is a nut 75 having a lug 76 thereon in which is a groove 77 adapted to engage a key 78 firmly attached to the channel 12 on the mold frame 10. As the mold truck is run on to the stripper, the key 78 enters the grooves 77. Each lug 76 is thereby prevented from slipping outwardly. The two nuts 75 at each side of the frame are connected by bracing bars 79, and closed sleeves 80 are secured to the nuts for protecting the upper ends of the screws when the nuts are lowered.

In operation, the mold truck after being properly positioned on the stripping truck, and the stripping truck having been transported to the desired location, such as the kiln, the motor 72 is driven to turn the screws 66 in a suitable direction to move the nuts 75 downwardly. This exerts a pull on the side channels 12 rigidly secured to the mold frame 10 and thereby forces the mold frame 10 downwardly so that the blocks are ejected in the manner hereinbefore described. The blocks may then be removed, after which the motor is reversed to lift the mold frame until the latches 20, by reason of the pressure exerted by compression spring 27, spring outwardly into engagement with the tops of the cylinders 8, whereupon the molds are ready to be again filled.

In a plant of the type shown in Fig. 1, there are preferably several mold trucks, and one or more stripping trucks. The tracks C and C' are on a level sufficiently high to permit mold trucks thereon to be run directly on to and off the stripping truck frame. The mold trucks, one at a time, are filled, pressed, and run on to the stripping truck, which conveys each mold truck to the kilns or other unloading place. There the mold truck is unloaded, the molds raised to the proper level, the stripping truck moved back until the empty trucks ready for loading can be discharged on track C'. After each empty truck is run off, the stripper is transported to a suitable position to receive another truck from track C. By operation of the turn-tables or other suitable switching devices, the stripping truck can be manipulated to suitable positions for receiving, stripping, and discharging the trucks.

While I have described a preferred embodiment of the invention, it is obvious that changes may be made within the contemplation of my invention and within the scope of the appended claims.

What I claim is:

1. Apparatus for molding plastic blocks comprising a movable mold, a filling device beneath which the said mold is adapted to pass, a press beneath which the movable mold is adapted to pass, and a movable stripping device supported on trucks for receiving and transporting the molds and for stripping the blocks from the mold after the mold has been moved from beneath the press and received by said stripping device.

2. Apparatus for molding plastic blocks comprising a detached truck supported mold transportable from place to place, a filling device beneath which the mold truck may pass, a press adapted to engage the mold truck, and a stripper for receiving and supporting the mold truck after it has passed from beneath the press.

3. Apparatus for molding plastic blocks comprising a detached truck supported mold, a filling device beneath which the mold truck may pass, a press adapted to engage the mold truck, and a transportable stripper supported on a truck for receiving the mold truck after it has passed from beneath the press.

4. Apparatus for molding plastic blocks comprising a detached truck supported mold, a press adapted to receive the mold and truck, and a stripper onto which the mold and truck may be moved after pressing, which stripper may be positioned at any desired point independently of the position of the press.

5. Apparatus for molding plastic blocks comprising a truck supported mold, a filling device beneath which the mold truck may pass, a press on the same floor level as the filling device and beneath which the truck and mold may be moved, and a truck supported stripper on a floor level below the level of the press and filler and onto which the truck and mold may be moved after passing from beneath the press.

6. Apparatus for molding plastic blocks comprising a truck supported mold, a filling device, a press, a track extending beneath the filling device and press, other tracks communicating with said first mentioned tracks and on a common level, other tracks at a level below the first mentioned tracks, and a stripping truck for ejecting molded blocks from the mold truck movable on the tracks on the lower level and adapted to receive and discharge mold trucks from and to the tracks on the upper level.

7. A mold truck comprising a movably supported bed member, a mold frame supported by said bed member and movable vertically relatively thereto, bottom members for said molds supported above the bed member but independently of the mold frame, whereby the mold is also movable vertically relatively thereto, and side frame members on the mold frame adapted to co-operatively engage supporting and stripping devices, said side frame members having means thereon adapted to coact with means on a stripping device to prevent lateral movement of the means on the stripping device when in engagement therewith.

8. A mold truck comprising a bed supported on wheels, a mold frame supported by said bed member and movable vertically with relation thereto, bottom members for the mold having a sliding engagement with the mold frame, means secured to the bed and independent of the mold frame for supporting said bottom members, and frame members on the mold and projecting therefrom for engagement with yieldable supporting means and with stripping devices.

9. A mold truck comprising a bed frame supported on wheels, a mold frame supported by said bed frame and movable vertically with relation thereto, bottom members for the mold having a sliding engagement with the mold frame, means secured to the bed frame and independent of the mold frame for supporting said bottom members, latch means for movably holding the mold frame in a raised position but which may be released for permitting the mold frame to be moved, and other means coöperating with the mold for permitting a gradual lowering of the mold when the latch means is released and serving to yieldably support the mold when pressure is applied thereto.

10. A mold truck comprising a bed frame supported on wheels, a mold frame supported by said bed frame and movable vertically with relation thereto, bottom members for the mold having a sliding engagement with the mold frame, means secured to the bed frame and independent of the mold frame for supporting said bottom members, said means carried on the mold truck for normally holding the mold frame in a raised position but which may be released for permitting the mold frame to be moved.

11. A mold truck comprising a bed frame supported on wheels, a mold frame supported by said bed frame and movable vertically with relation thereto, bottom members for the mold having a sliding engagement with the mold frame, means secured to the bed frame and independent of the mold frame for supporting said bottom members, and means carried on the mold truck operable upon the application of pressure thereto for normally holding the mold frame in a raised position but which may be released for permitting the mold frame to be moved.

12. A mold truck comprising a bed frame supported on wheels, a mold frame, a telescoping support for movably holding the mold frame above the bed frame, latch members on the mold frame engaging stationary members on the bed frame for holding the mold frame in elevated position, and plunger operated means connected with said latches for effecting the operation thereof.

13. A mold truck comprising a bed frame supported on wheels, a mold frame, a telescoping support for movably holding the mold frame above the bed frame, latch members on the mold frame engaging stationary members on the bed frame for holding the mold frame in elevated position, plunger operating means connected with said latches for effecting the operation therefor, a plunger, and means beneath the plunger for movably supporting the mold to maintain it in elevated position after said latches have been released by the plunger and to control the downward movement of the mold.

14. A molding apparatus comprising a movable mold truck having a vertically movable mold thereon, means for holding the mold frame in extended position, press means adapted to engage said movable mold and having means thereon for releasing the holding means, and a stripper adapted to receive the mold truck and move the mold frame after the truck has been engaged by the press.

15. A molding apparatus comprising a movable mold truck having a vertically movable mold thereon, means for holding the mold frame in an elevated position, a press for compacting the contents of the mold frame, and means for releasing said holding means when being pressed.

16. A molding apparatus comprising a movable mold truck having a vertically movable mold thereon, means for holding the mold frame in an elevated position, a press for compacting the contents of the mold frame, means for releasing said holding means when being pressed, and a stripper adapted to receive the mold truck, said stripper having means thereon for engaging said movable mold frame to lower it to eject molded blocks and to raise it whereupon the holding means may be rendered effective.

17. Apparatus for molding plastic blocks comprising a mold filling unit, a separate press unit, a stripping unit, and detached transportable molds adapted to be moved from place to place and having relatively movable parts, said stripping units having means thereon for receiving and supporting the transportable molds and for ejecting the blocks therefrom by effecting relative movement between the parts.

18. Apparatus for molding plastic blocks comprising a truck supported mold, a filling means beneath which the mold may pass, a press beneath which the mold may move, a truck supported stripper movable from place to place, and means whereby the mold truck may be moved on to the stripper, and means on the stripper having coöperative engagement with the mold.

19. Apparatus for molding plastic blocks comprising a detached mold truck having a mold thereon, which mold has relatively movable parts, filling and pressing devices, tracks for the mold truck, a stripper, and means whereby the detached mold truck may be moved from the tracks to the stripper, and means on the stripper for securing the mold truck in position thereon and for ejecting molded blocks from the mold by effecting a relative movement of the mold parts.

20. A molding apparatus comprising a movable mold truck, a mold on the truck, a filling device beneath which the mold is adapted to be moved and a distributing means in the filling device movable across the top of the mold and adapted to sweep the material into all parts of the mold.

21. A molding apparatus comprising a movable mold truck, a mold thereon, a filling device beneath which the mold is adapted to be moved, a press, means engaging trucks for progressively moving them under the filling device to the press, and means in the filling device movable across the top of the mold for sweeping the material into all parts of the mold as the mold moves therebeneath.

22. A molding apparatus comprising a movable mold truck, a mold thereon, a filling device beneath which the mold is adapted to be moved, a press, means engaging trucks for progressively moving them under the filling device to the press, means in the filling device for sweeping the material into all parts of the mold as the mold moves therebeneath, said filling device having delivering means co-extensive with the width of the mold, the sweeping means therein also being substantially co-extensive with the width of the mold and rotatably driven.

23. A molding apparatus comprising a movable mold truck, a mold thereon, a filling device beneath which the mold is adapted to be moved, a press, means engaging trucks for progressively moving them under the filling device to the press, means in the filling device for sweeping the material into all parts of the mold as the mold moves therebeneath, said filling device having delivering means co-extensive with the width of the mold, the sweeping means therein also being substantially co-extensive with the width of the mold and rotatably driven, and means for varying the rotative movement of the device to proportion it to the speed of travel of the mold truck.

24. In apparatus for feeding material into molds comprising a hopper having an open bottom beneath which molds are adapted to be passed, the width of the opening in the bottom corresponding substantially to the width of the mold, an agitator centrally positioned in the open bottom of the hopper, and means for alternately rotating the agitator in opposite directions to effect an even distribution of material in the molds.

In testimony whereof I hereunto affix my signature.

FRANCIS J. STRAUB.